United States Patent
Sip

(10) Patent No.: US 8,120,316 B2
(45) Date of Patent: Feb. 21, 2012

(54) WIRELESS CHARGING SYSTEM

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 371 days.

(21) Appl. No.: 12/541,126

(22) Filed: Aug. 13, 2009

(65) Prior Publication Data

US 2010/0259214 A1    Oct. 14, 2010

(30) Foreign Application Priority Data

Apr. 8, 2009    (CN) .......................... 2009 1 0301432

(51) Int. Cl.
    *H02J 7/00* (2006.01)
(52) U.S. Cl. ....................................... 320/108; 320/114
(58) Field of Classification Search ................... 320/108
    See application file for complete search history.

(56) References Cited

U.S. PATENT DOCUMENTS

| | | | | |
|---|---|---|---|---|
| 6,316,909 | B1 * | 11/2001 | Honda et al. ................... | 320/108 |
| 7,948,208 | B2 * | 5/2011 | Partovi et al. ................. | 320/108 |
| 7,952,332 | B2 * | 5/2011 | Chojecki et al. .............. | 323/222 |
| 2008/0111518 | A1 * | 5/2008 | Toya .............................. | 320/108 |
| 2009/0096413 | A1 * | 4/2009 | Partovi et al. ................. | 320/108 |
| 2009/0140691 | A1 * | 6/2009 | Jung .............................. | 320/108 |
| 2009/0153098 | A1 * | 6/2009 | Toya et al. .................... | 320/108 |

* cited by examiner

*Primary Examiner* — Ramy Ramadan
(74) *Attorney, Agent, or Firm* — Altis Law Group, Inc.

(57) ABSTRACT

A wireless charging system charging an electronic device wirelessly via electromagnetic induction between a number of transmitting coils formed in the wireless charging system and a receiving coil formed in the electronic device. The wireless charging system selects the transmitting coil aligned with the receiving coil most accurately for transmitting electromagnetic energy in order to improving the energy conversion efficiency between the transmitting coil and the receiving coil.

4 Claims, 3 Drawing Sheets

WIRELESS CHARGING SYSTEM

BACKGROUND

1. Technical Field

The present disclosure relates to wireless charging systems.

2. Description of Related Art

A wireless charger can charge an electronic device using a transmitting coil of the charger and a receiving coil of the electronic device. Generally, wireless energy transmission can achieve the highest transmission efficiency when the transmitting coil is aligned with the receiving coil. However, the receiving coil is typically packed within the electronic device and the specific location of the receiving coil in the electronic device varies depending on the type of the electronic device. Therefore, it is difficult to place different types of electronic devices on the charger so that the receiving coil is exactly aligned with the transmitting coil.

Therefore, it is desirable to provide a wireless charging system which can overcome the above-mentioned problems.

DETAILED DESCRIPTION

Figure 1:
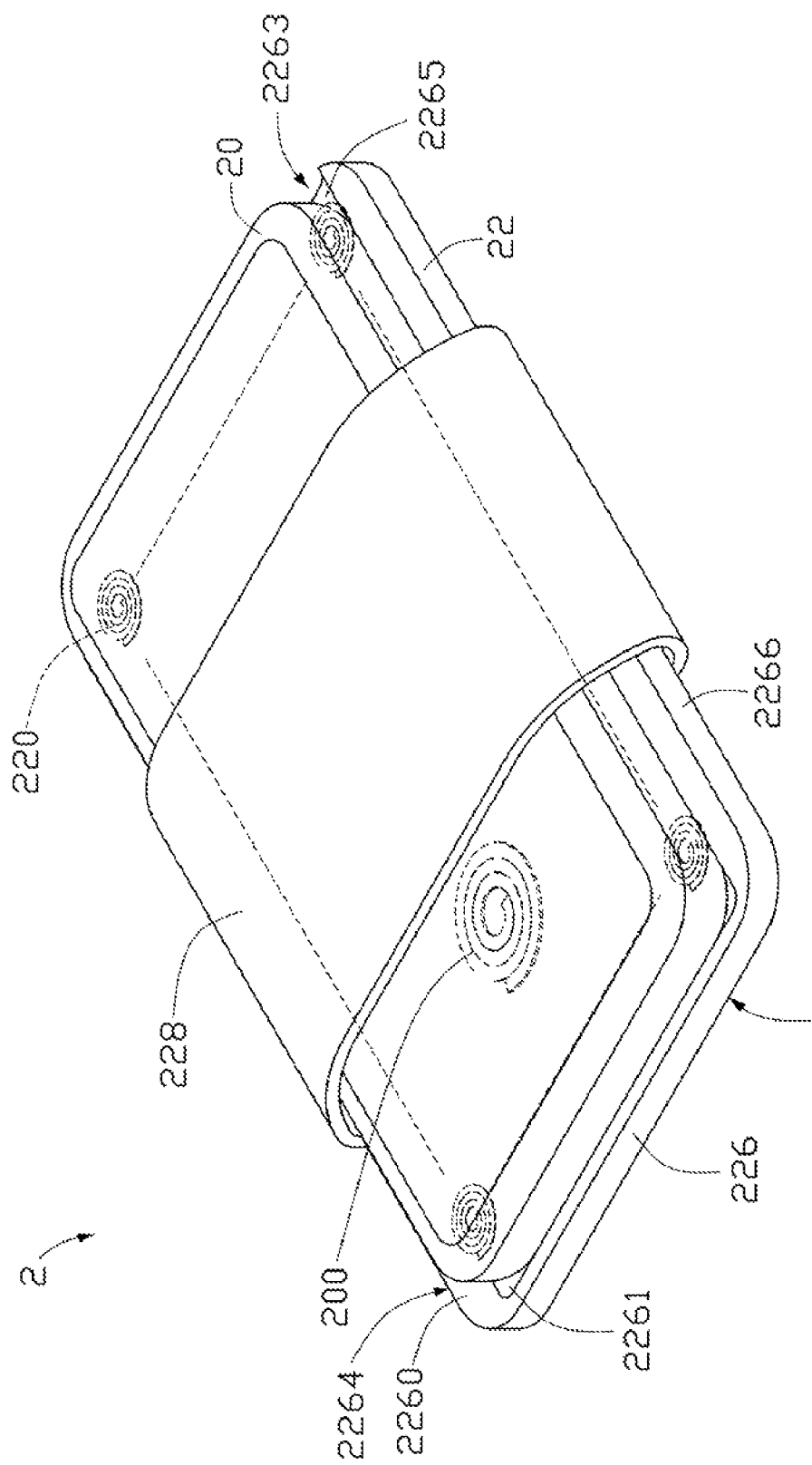
FIG. 1 is an isometric schematic view of an exemplary embodiment of a wireless charger and an electronic device.
Figure 2:
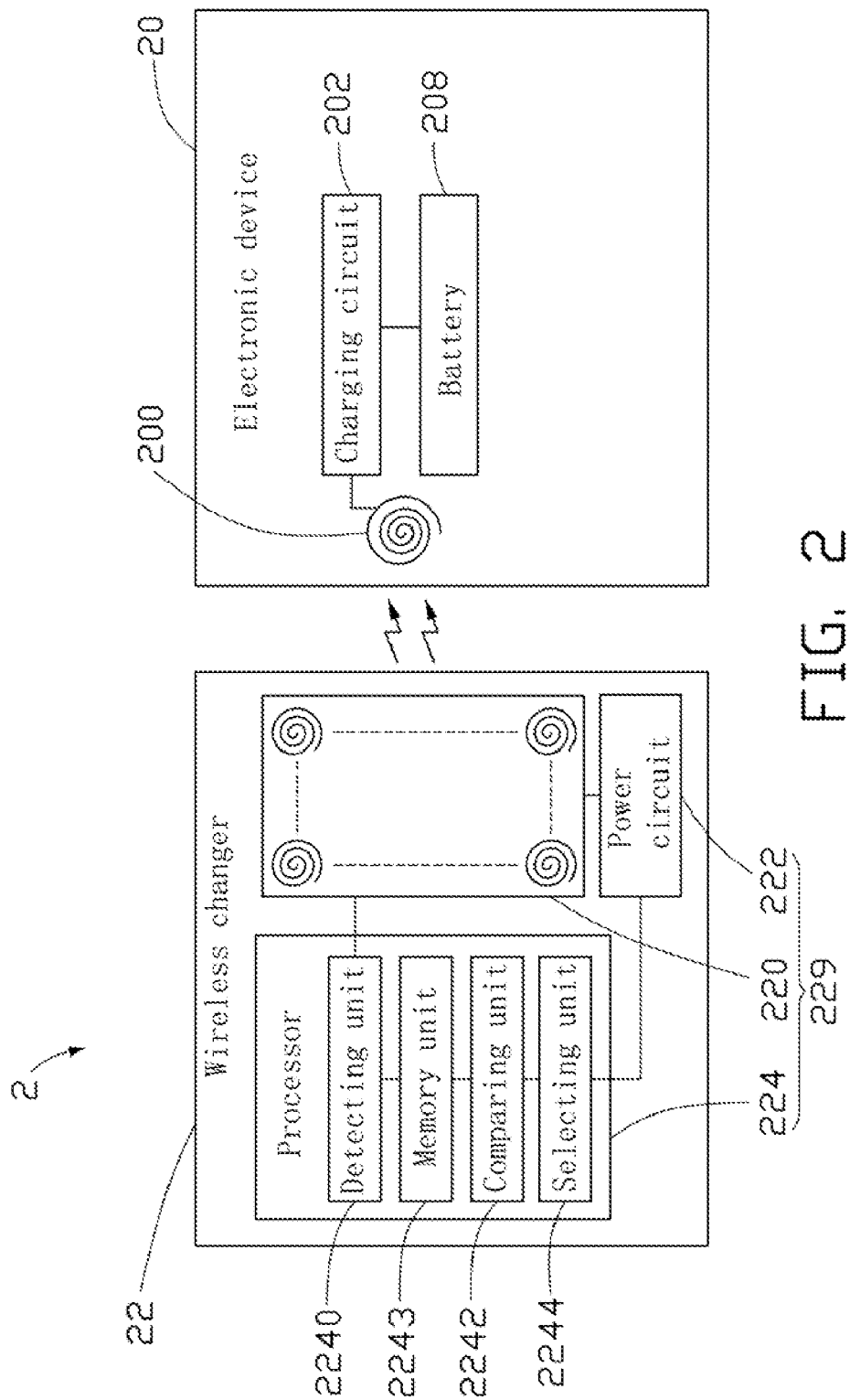
FIG. 2 is a block diagram of the wireless charger and the electronic device of FIG. 1.

Referring to FIGS. 1-2, a wireless charger 22 for charging an electronic device 20 in accordance with an exemplary embodiment is illustrated. The wireless charger 22 includes a base 226, a fastening part 228, and a charging portion 229. The electronic device 20 includes a receiving coil 200 and a battery 208. The charging portion 229 transmits electromagnetic energy wirelessly. The electromagnetic energy induces a current in the receiving coil 200 and the current is used to charge the battery 208. The wireless charger 22 and the receiving coil 200 constitute a complete wireless charging system 2.

The base 226 is substantially a rectangular plate and includes an upper surface 2260, a lower surface 2262, a first sidewall 2264, and a second sidewall 2266 parallel to the first sidewall 2264. The upper surface 2260 defines a groove 2261 for accommodating the electronic device 20. The groove 2261 includes an open-end 2263 and a bottom surface 2265.

The charging portion 229 includes a number of transmitting coils 220, a power circuit 222, and a processor 224.

The transmitting coils 220 are configured for transmitting electromagnetic energy. The transmitting coils 220 are arranged in a matrix manner. Each of the transmission coils 220 is assigned a positioning code for distinguishing each other.

The power circuit 222 is connected to a power source (not shown) for providing electrical power from the power source to the transmitting coils 220. It should be understood that the power source applies an alternating current to the transmitting coils 220. If the power source is a direct current power source, the power circuit 222 can convert a direct current from the power source into the alternating current.

The processor 224 is configured for determining which of the transmitting coils 220 should be connected to the power circuit 222 before charging. The processor 224 includes a detecting unit 2240, a comparing unit 2242, a selecting unit 2244, and a memory unit 2243.

The detecting unit 2240 is configured for selectively connecting the transmitting coils 220 to the power circuit 222 one by one and detecting a load power value of each of the transmitting coil 220.

The memory unit 2243 is configured for storing the load power values and the positioning codes of the transmitting coils 220.

The comparing unit 2242 is configured for comparing the load power values of the transmitting coils 220 to locate the transmitting coil having the highest load power value.

The selecting unit 2244 is configured for connecting the transmitting coil 220 having the highest load power value to the power circuit 222 and disconnecting the other transmitting coils 220 from the power circuit 222.

Figure 3:
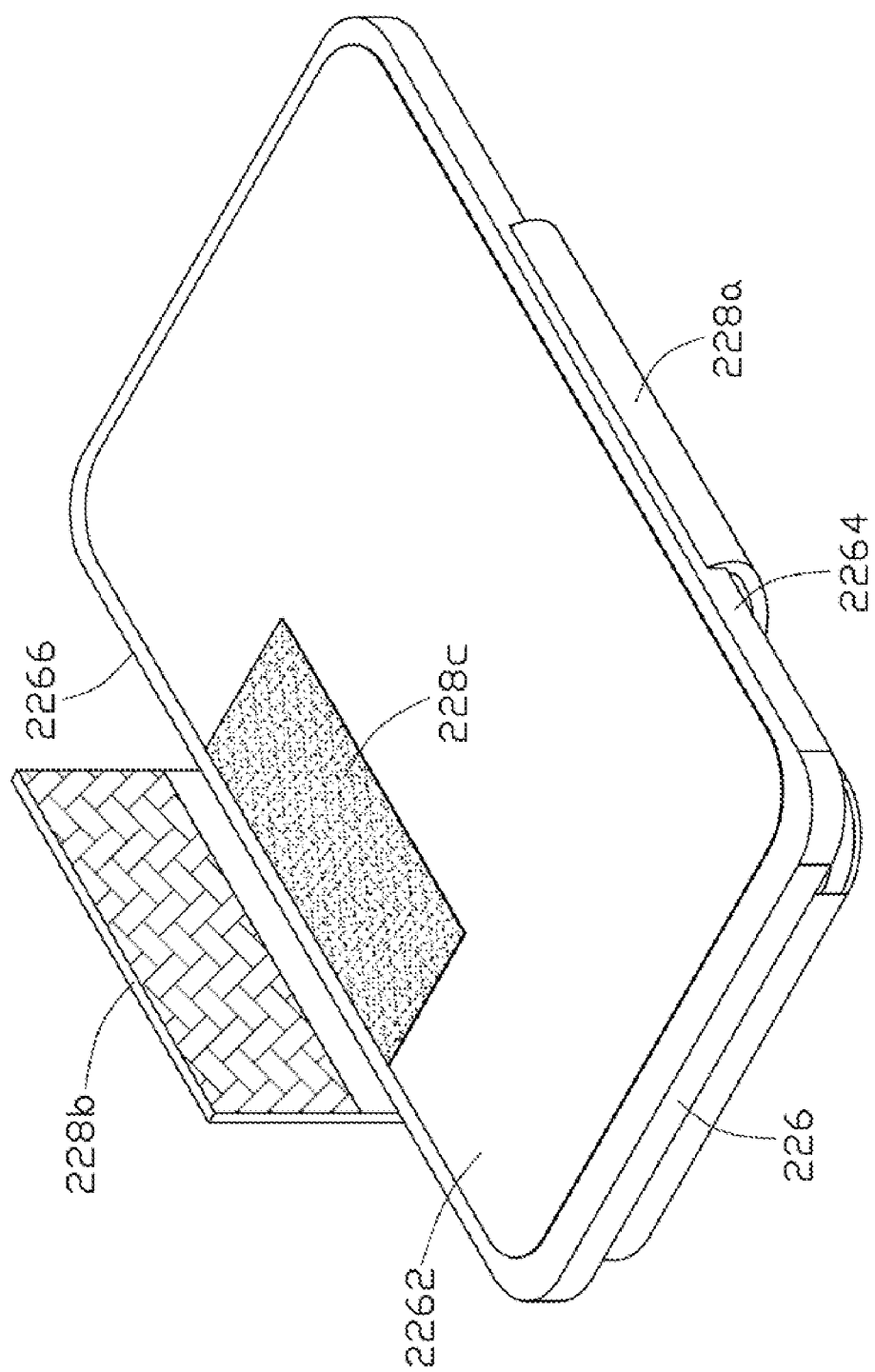
FIG. 3 is an isometric schematic view of the wireless charger and the electronic device of FIG. 1, viewed from another angle.

Also referring to FIG. 3, the fastening part 228 is configured for fastening the electronic device 20. The fastening part 228 includes a fixing strap 228a, a first fastening piece 228b, and a second fastening piece 228c. The first fastening piece 228b can be fastened to the second fastening piece 228c. For example, the first fastening piece 228b and the second fastening piece 228c are a pair of fabric hook-and-loop fasteners or a pair of snap fasteners.

The electronic device 20 further includes a charging circuit 202 connected to the receiving coil 200 and the battery 208 for converting an alternating current generated by the receiving coil 200 into a direct current for charging the battery 208.

In assembly, the transmitting coils 220 are packed within the base 226. Each of the transmitting coils 220 is connected to the power circuit 222 through a switch (not shown). The processor 224 is connected to the power circuit 222 and the transmitting coils 220. The fixing strap 228a is connected to the first sidewall 2264 using one end. The first fastening piece 228b is fixed at the other end of the fixing strap 228a. The second fastening piece 228c is fixed on the lower surface 2262 correspondingly to the first fastening piece 228b.

In use, the electronic device 20 slides into the groove 2261. The fixing strap 228a wraps around the electronic device 20. The first fastening piece 228b couples with the second fastening piece 228c for fastening the electronic device 20 to the base 226.

The detecting unit 2240 connects the transmitting coils 220 to the power circuit 222 one by one and detects the load power value of each transmitting coil 220. The memory unit 2243 stores the load power values of the transmitting coils 220.

Because the receiving coils 200 are aligned with the transmitting coil 220 more accurately, the receiving coils 200 can be better induced by the electromagnetic energy transmitted from the transmitting coil 220 and the load power value of the transmitting coil 220 is higher. The comparing unit 2242 compares the load power value of each of the transmitting coils 220 and determines the positioning code associated with the transmitting coil 220 having the highest load power value.

The selecting unit 2244 connects the transmitting coil 220 having the highest load power to the power circuit 222 and disconnects the other transmitting coils 220 from the power circuit 222. In principle, the transmitting coil 220 having the highest load power value is the transmitting coil 220 most aligned with the receiving coil 200 accurately. As such, the highest energy transmission efficiency can be achieved when charging the electronic device 20 using the transmitting coil 220 having the highest load power value.

The receiving coil 200 is induced by electromagnetic energy to generate an alternating current. The charging circuit 202 converts the alternating current generated by the receiving coil 200 into a direct current for charging the battery 208.

The wireless charger 22 selects the transmitting coil 220 most aligned with the receiving coil 200 accurately for transmitting the electromagnetic energy via comparing the load power of each transmitting coil 220. Therefore, the energy conversion efficiency between the transmitting coil 220 and the receiving coil 200 can be improved.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A wireless charging system for charging a battery of an electronic device, the wireless charging system comprising:
    a receiving coil in the electronic device connected to the battery;
    a base;
    a plurality of transmitting coils formed within the base, each of the plurality of transmitting coils is for transmitting electromagnetic energy which is capable of inducing a current in the receiving coil for charging the battery; and
    a processor connected to the transmitting coils for selectively activating the transmitting coils one by one and detecting a load power value of each transmitting coil before charging, and activating the transmitting coil having the highest load power but inactivating the other transmitting coils when charging;
    wherein the base comprising an upper surface, a lower surface, a first sidewall, and a second sidewall parallel to the first sidewall; the upper surface defines a groove thereon; and the groove comprises an open-end and a bottom surface;
    wherein the transmitting coils are formed under the bottom surface of the base; the transmitting coils are arranged in a matrix manner; and each of the transmitting coils is assigned a positioning code for distinguishing each other;
    wherein further comprising a power circuit connected to the transmitting coils for providing electrical power to the transmitting coils; and
    wherein the processor comprises: a detecting unit configured for selectively connecting the transmitting coils to the power circuit one by one and detecting the load power value of each of the transmitting coils; a memory unit configured for storing the load power values and the corresponding positioning codes of the transmitting coils; a comparing unit configured for comparing the load power value of each of the transmitting coils to locate the transmitting coil having the highest load power value; and a selecting unit configured for connecting the transmitting coil having the highest load power value to the power circuit and disconnecting the other transmitting coils from the power circuit.

2. The wireless charging system as claimed in the claim 1, further comprising a fastening part; the fastening part comprises a fixing strap, a first fastening piece, and a second fastening piece coupled with the first fastening piece; the fixing strap is connected to the first sidewall using one end thereof, the first fastening piece is fixed at the other end of the fixing strap; the second fastening piece is fixed on the lower surface near to the second sidewall; and the fixing strap wraps around the electronic device with the first fastening piece coupled with the second fastening piece for fastening the electronic device on the bottom surface of the groove.

3. The wireless charging system as claimed in claim 2, wherein the first fastening piece and the second fastening piece are a pair of fabric hook-and-loop fasteners or a pair of snap fasteners.

4. The wireless charging system as claimed in claim 1, wherein the electronic device further comprises a charging circuit; the receiving coil is induced by the electromagnetic energy and generates the alternating current, and the charging circuit converts the alternating current into the direct current for charging the battery.

* * * * *